(12) United States Patent
Wastel

(10) Patent No.: US 11,104,237 B2
(45) Date of Patent: Aug. 31, 2021

(54) ELECTRIC VEHICLE CHARGING APPARATUS FOR AUTOMATED VEHICLE PARKING FACILITY

(71) Applicant: Park Plus, Inc., Oakland, NJ (US)

(72) Inventor: Andreas Wastel, Randolph, NJ (US)

(73) Assignee: Park Plus, Inc., Fairview, NJ (US)

( * ) Notice: Subject to any disclaimer, the term of this patent is extended or adjusted under 35 U.S.C. 154(b) by 25 days.

(21) Appl. No.: 16/264,799

(22) Filed: Feb. 1, 2019

(65) Prior Publication Data

US 2019/0232811 A1    Aug. 1, 2019

Related U.S. Application Data

(60) Provisional application No. 62/625,105, filed on Feb. 1, 2018.

(51) Int. Cl.
| | |
|---|---|
| *B60L 53/16* | (2019.01) |
| *G07F 15/00* | (2006.01) |
| *B60L 53/35* | (2019.01) |
| *B60L 53/122* | (2019.01) |
| *G06Q 20/14* | (2012.01) |
| *G06Q 20/12* | (2012.01) |
| *G07F 17/24* | (2006.01) |

(52) U.S. Cl.
CPC ............ *B60L 53/16* (2019.02); *B60L 53/122* (2019.02); *B60L 53/35* (2019.02); *G06Q 20/127* (2013.01); *G06Q 20/145* (2013.01); *G07F 15/005* (2013.01); *G07F 17/24* (2013.01)

(58) Field of Classification Search
CPC ....................................................... B60L 53/16
USPC ............................................................ 320/108
See application file for complete search history.

(56) References Cited

U.S. PATENT DOCUMENTS

| | | | | |
|---|---|---|---|---|
| 2014/0333254 A1* | 11/2014 | Teng | ........................ | H02J 50/12 320/108 |
| 2017/0142872 A1* | 5/2017 | Ricci | ...................... | B60W 20/14 |
| 2017/0297437 A1* | 10/2017 | Kim | .................... | H01R 13/6205 |

* cited by examiner

*Primary Examiner* — Robert Grant
(74) *Attorney, Agent, or Firm* — Gerald E. Hespos; Michael J. Porco; Matthew T. Hespos

(57) ABSTRACT

A charging apparatus for electric or plug-in hybrid vehicles includes a stationary inductive coil fixed in a position adjacent to a parking spot for the vehicle so that a charging surface of the stationary inductive coil is aligned substantially vertically. The charging apparatus further has a movable electric coil assembly that is magnetically mountable to a brake component of the vehicle and having a charging surface aligned with the charging surface of the stationary inductive coil when the vehicle is parked. A charging cable extends from the stationary inductive coil and has a plug that is electrically connectable to a charging outlet of the vehicle. The vehicle is parked with the inductive coils aligned so that an inductive charging operation can be carried out.

2 Claims, 6 Drawing Sheets

ELECTRIC VEHICLE CHARGING APPARATUS FOR AUTOMATED VEHICLE PARKING FACILITY

This application claims priority on U.S. Provisional Application No. 62/625,105 filed on Feb. 1, 2018, the entire disclosure of which is incorporated herein by reference.

BACKGROUND

Field of the Invention

The invention relates to an apparatus for charging electric vehicles or plug-in hybrid vehicles in an automated parking facility.

Description of the Related Art

Automated parking facilities enable a vehicle to be parked and retrieved without human intervention. One type of automated parking facility uses at least one automated guided vehicle (AGV). The facility has at least one access point that enables a vehicle to be driven onto a parking platform or pallet that is elevated a relatively short distance from the floor or other supporting surface. The AGV moves under the pallet and lifts the pallet with the vehicle thereon. The AGV then moves to an appropriate vacant parking spot in the facility and deposits the pallet and the vehicle at that parking spot. The AGV then moves away from the pallet and vehicle to another specified location for picking up and moving another pallet/vehicle combination. The AGV will return to the previously parked pallet and vehicle when the vehicle owner returns to retrieve the vehicle. More particularly, the AGV will move beneath the pallet, lift the pallet and vehicle, and return to the access point of the parking facility. A parking system of this type is disclosed, for example, in U.S. Pat. No. 9,670,690, the contents of which are incorporated herein by reference.

A more recent variation of the above-described automated parking facility is operative without the use of pallets. In this system, the AGV will position supports directly beneath the wheels of the vehicle and then lift the vehicle by forces exerted on the wheels. The AGV then will move the vehicle to an available parking spot, deposit the vehicle at the parking spot and then move to another location for parking or retrieving a vehicle. The AGV then will return to the parked vehicle and deliver the vehicle to the access point when the vehicle owner returns to retrieve the vehicle. Systems of this type avoid the costs associated with pallets and the problems associated with storing pallets near the access point in the parking facility. In one embodiment, the access point and the parking points have floors with an array of slots. The AGV has supports with fingers that interdigitate with the slots in the floor. Parked vehicles will have many different dimensions. Accordingly, the array of fingers on the AGV must be dimensioned to accommodate the different wheel bases for the vehicles that are to be parked or must be adjustable in accordance with the wheelbase of the vehicle.

Many parking facilities have charging stations for accommodating electric vehicles or plug-in hybrid vehicles so that the battery of the vehicle can be recharged while the vehicle is parked. The typical charging station will have a cable that can be plugged into a charging outlet on the vehicle. This typical arrangement of charging stations in a parking facility becomes more complicated with the automated parking facilities because the vehicle owner generally does not travel to the parking spot.

Most charging stations are configured to charge a vehicle quickly and the electrical systems for safely and quickly charging an electric vehicle or a plug-in hybrid are expensive. The costs associated with such a charging station are essentially prohibitive for widescale availability of such charging stations in a large parking facility.

Some systems use inductive charging for electric vehicles or plug-in hybrid vehicles. However, inductive charging requires precise positioning of the charging coil on the vehicle with respect to a stationary charging coil. These types of systems also are not well suited for use in the above-described automated parking facility in view of the many different locations on the vehicle where the induction coil may be disposed. Thus, it may be difficult or impossible to ensure that the inductive coil on the vehicle can be aligned with the inductive coil at a parking spot in view of an absence of standardization for the location of the inductive coil on the vehicle.

Trickle charging is well known for slowly applying or maintaining a charge to a vehicle that is not likely to be used for a long time. For example, trickle charging is used frequently at vacation homes or in situations where the vehicle owner will be traveling for an extended time. The voltage and current levels involved in trickle charging are much lower than in high speed charging, and thus the trickle charging apparatus is significantly less expensive than a high speed charging apparatus. The trickle charging theories can be applied to inductive charging. The trickle charging theories also could be applied at a parking facility for those situations where a vehicle will be parked for a significant part of a day. However, trickle charging at an automated parking facility has been complicated by the fact that the vehicle owner does not travel to the parking spot for making the connection between the charging station and the vehicle.

It is an object of the invention to provide improvements for charging an electric vehicle or a plug-in hybrid vehicle that will be parked at an automated parking facility

SUMMARY OF THE INVENTION

The invention relates to an apparatus and method for charging an electric vehicle or a plug-in hybrid vehicle at an automated parking facility. The apparatus and method are particularly well-suited for an automated parking facility that uses an automated guided vehicle (AGV) configured to retrieve, move and deposit a parked vehicle without requiring the vehicle to be positioned on a pallet.

The apparatus of the invention includes a stationary inductive coil disposed at one or more parking spots in the automated parking facility. The stationary inductive coil may be mounted to brackets that in turn are mounted to a floor of the automated parking facility at a specified position with respect to the parking spot. The bracket of the stationary inductive coil may be configured so that a charging surface of the coil is aligned substantially vertically at a specified height.

The apparatus of the invention also includes a movable inductive coil assembly that can be mounted to a vehicle in the automated parking facility. The movable inductive coil assembly includes a coil with a charging surface that can be positioned in opposed relationship to the charging surface of the stationary inductive coil that is mounted at the parking spot. The movable inductive coil assembly further includes a plurality of magnets adjustably mounted to a rear surface of the movable inductive coil, and hence a surface that will face away from the stationary inductive coil during a charging procedure. The magnets are intended for mounting to the brake housing of a particular wheel of the vehicle. In this regard, the brake housing of virtually all vehicles is formed from a ferromagnetic material. The outwardly facing surface of the brake housing is aligned vertically and is accessible through openings in the vehicle wheel. As a result, the adjustable magnets on the movable charging apparatus can be adjusted to positions on the movable charging apparatus for passing into or through openings in the wheel and mounting directly on the brake housing. The charging surface of the movable inductive coil, therefore, will be aligned substantially vertically and at a clearly identifiable position. The AGV used in an automated parking facility that does not employ pallets typically is guided to either the front wheels or the rear wheels because the AGV will lift the vehicle at the wheels. As a result, the AGV will know the precise position of the vehicle wheels and will be able to deposit the vehicle at the parking facility so that one of the wheels is directly opposed to the charging surface of the stationary inductive coil.

The movable inductive coil assembly further includes a charging cable that extends from the movable inductive coil. An end of the charging cable remote from the movable inductive coil includes a charging plug that is configured to connect to the charging outlet on the electric vehicle or the plug-in hybrid vehicle.

The apparatus of the invention can be used for charging an electric vehicle or a hybrid vehicle by using an AGV to position a vehicle at a location in a parking spot so that a designated wheel of the vehicle aligns in opposed relationship to the charging surface of the stationary inductive coil. An employee of the parking facility then merely adjusts the magnets on the movable inductive coil assembly for mounting to the ferromagnetic housing of the vehicle brake. In this mounted position, the charging surface of the movable inductive coil will be aligned vertically and in opposed relationship to the charging surface of the stationary inductive coil and at a preferred distance between the respective charging surfaces. The employee then will simply connect the plug of the charging cable to the outlet on the electric vehicle or plug-in hybrid vehicle.

The apparatus of the invention is well suited for commuter parking where the vehicle can be expected to remain at the parking facility for a major portion of a day. The apparatus of the invention also is very well suited for longer-term parking, such as parking at a car dealership where an electric vehicle or plug-in hybrid vehicle can be expected to remain stationary for days or weeks at a time. These situations are very well suited for trickle charging in view of the low costs and low power demands and the expectation that the vehicle will be at the parking spot for a long enough time to complete a charging process and/or to maintain a charged state.

DETAILED DESCRIPTION

Figure 1:
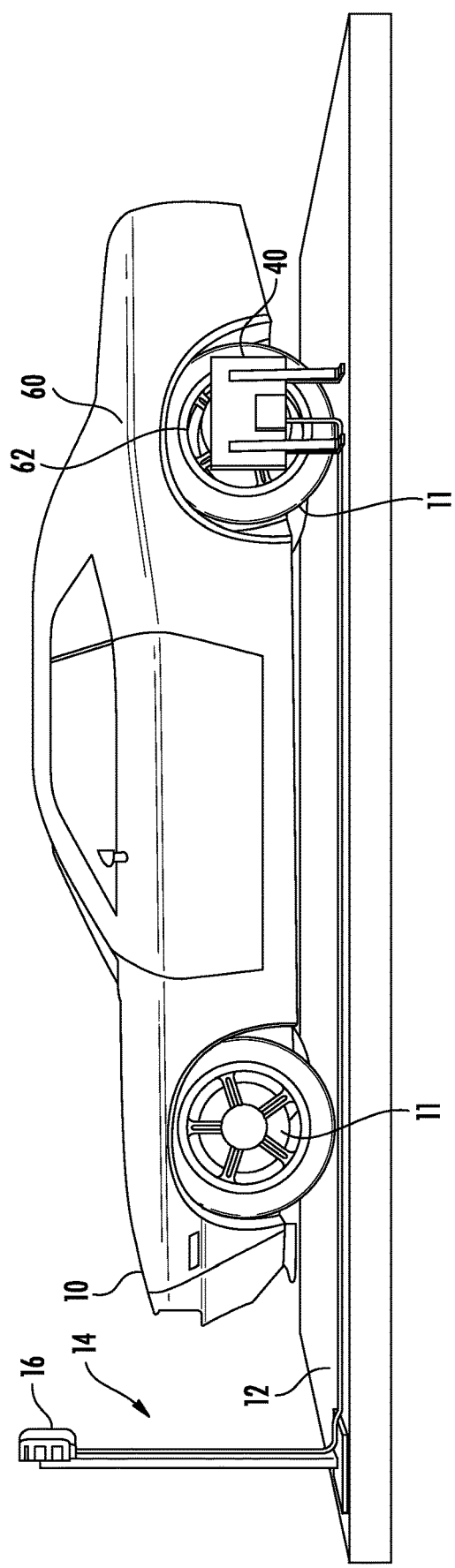
FIG. 1 is a side elevational view of an electric or plug-in hybrid vehicle at a parking spot at which the charging apparatus of the invention is being used to charge the vehicle.
Figure 2:
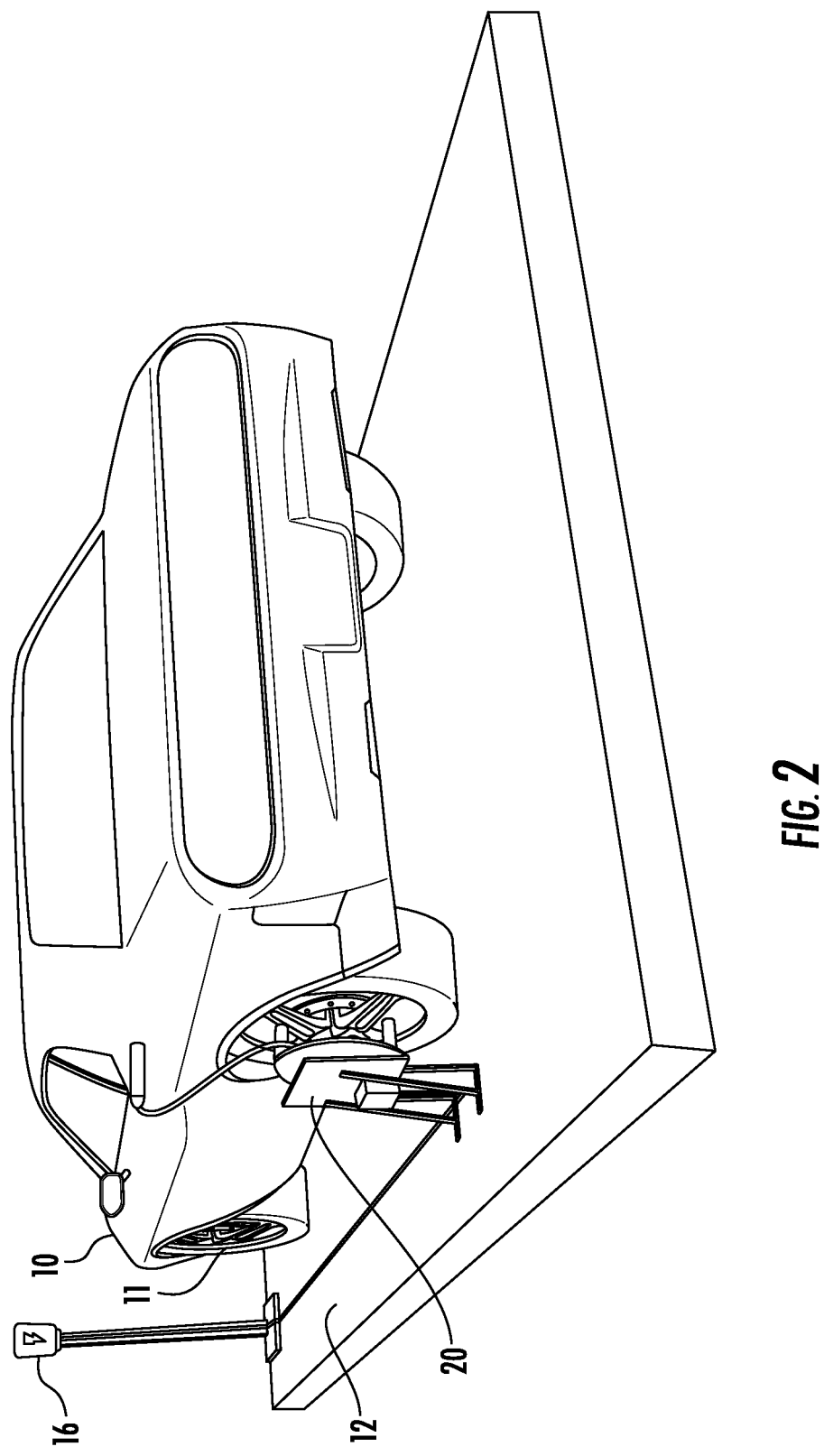
FIG. 2 is a rear perspective view of the vehicle and the charging apparatus of FIG. 1.

FIGS. 1-5 illustrate a vehicle 10 at a parking spot 12 in an automated parking facility, such as at a facility for relatively long term parking or in a car dealership. The vehicle 10 is an electric vehicle or a plug-in hybrid vehicle that is supported on wheels 11. The parking spot 12 at the parking facility includes a charging apparatus 14 that includes a control unit 16 for delivering power required for a charging operation of the vehicle 10. More particularly, the charging control unit 16 includes displays for indicating the initiation of a charging procedure and for indicating a state of charge of the vehicle battery. Additionally, the apparatus 14 may be configured as a trickle charging apparatus, and hence may be operative for delivering lower levels of power for the charging procedure than might otherwise be used for a high speed charging station.

The charging apparatus 14 also includes a stationary inductive coil 20 fixedly mounted on a bracket 22. The stationary inductive coil 20 is connected to the charging control unit 16 and has a charging face 24 that is aligned vertically and at a specified height determined by the bracket 22.

Figure 6:
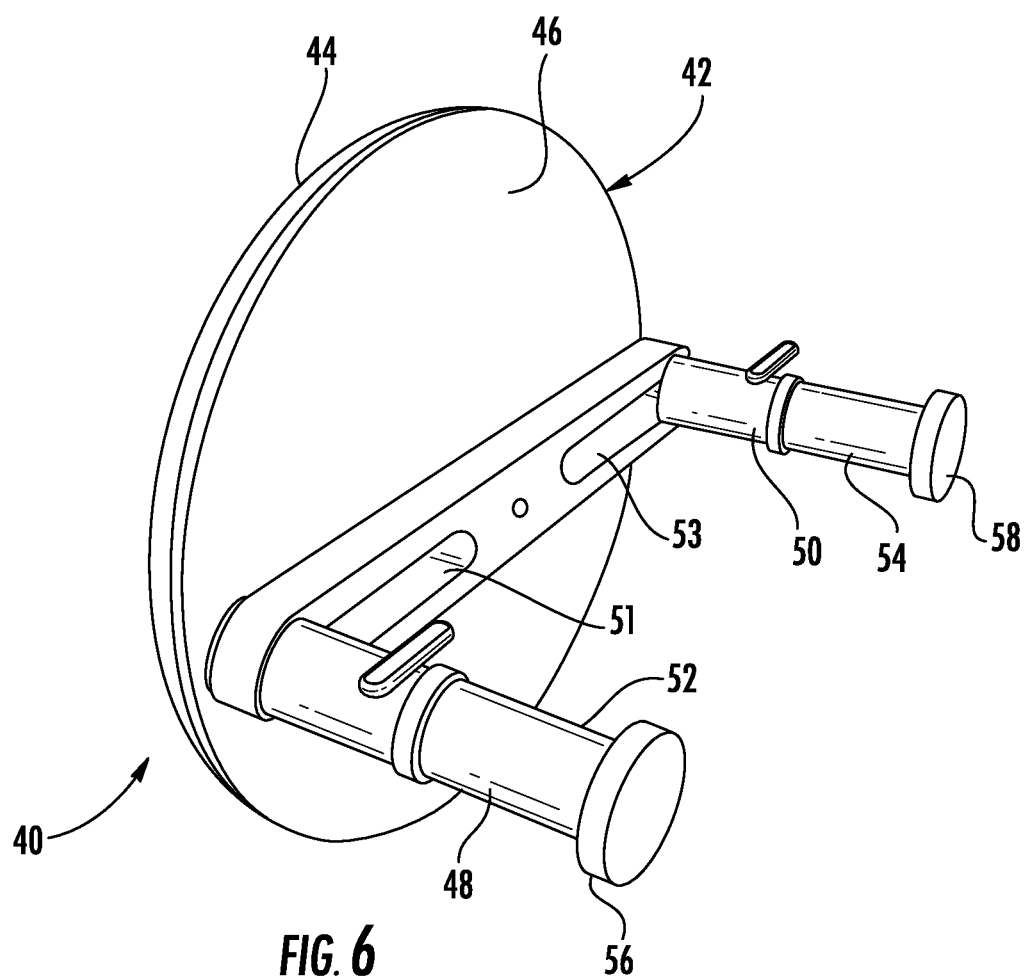
FIG. 6 is a rear perspective view of the movable inductive coil.

The charging apparatus 14 further includes a movable inductive coil assembly 40 that has an inductive coil 42 with a charging surface 44. As shown most clearly in FIG. 6, the movable inductive coil 42 has a rear surface 46 with two adjustable magnet assemblies 48 and 50 mounted thereon and projecting substantially parallel to one another and perpendicular to the rear surface 46 of the movable inductive coil 42. The magnet assemblies 48 and 50 are slidably engaged in grooves 51 and 53 respectively that extend radially on the rear surface 46 of the movable inductive coil 42. Thus, the magnet assemblies 48 and 50 can be moved toward and away from one another within a specified range. The magnet assemblies 48 and 50 also have telescoping bodies 52 and 54 provided respectively with magnets 56 and 58 mounted on the ends of the bodies 52 and 54 remote from the rear surface 46 of the movable inductive coil 42. The bodies 52 and 54 can be extended or retracted relative to the rear surface 46 of the movable inductive coil so that the distance between the magnets 56 and 58 and the rear surface 46 of the movable inductive coil 42 can be varied. The magnet assemblies 48 and 50 are adjusted relative to one another and relative to the movable inductive coil 42 into positions that enable the magnets 56 and 58 to be magnetically attached to a ferromagnetic housing of a wheel 11 of the vehicle 10. In a mounted state, the charging surface 44 of the movable inductive coil assembly 40 is aligned vertically at a specified height that can closely match the height of the charging face 24 of the stationary inductive coil 20.

The movable inductive coil assembly 40 further includes a charging cable 60 extending from the movable inductive coil 42. A charging plug 62 is mounted to the end of the charging cable remote from the movable inductive coil 42.

Figure 3:
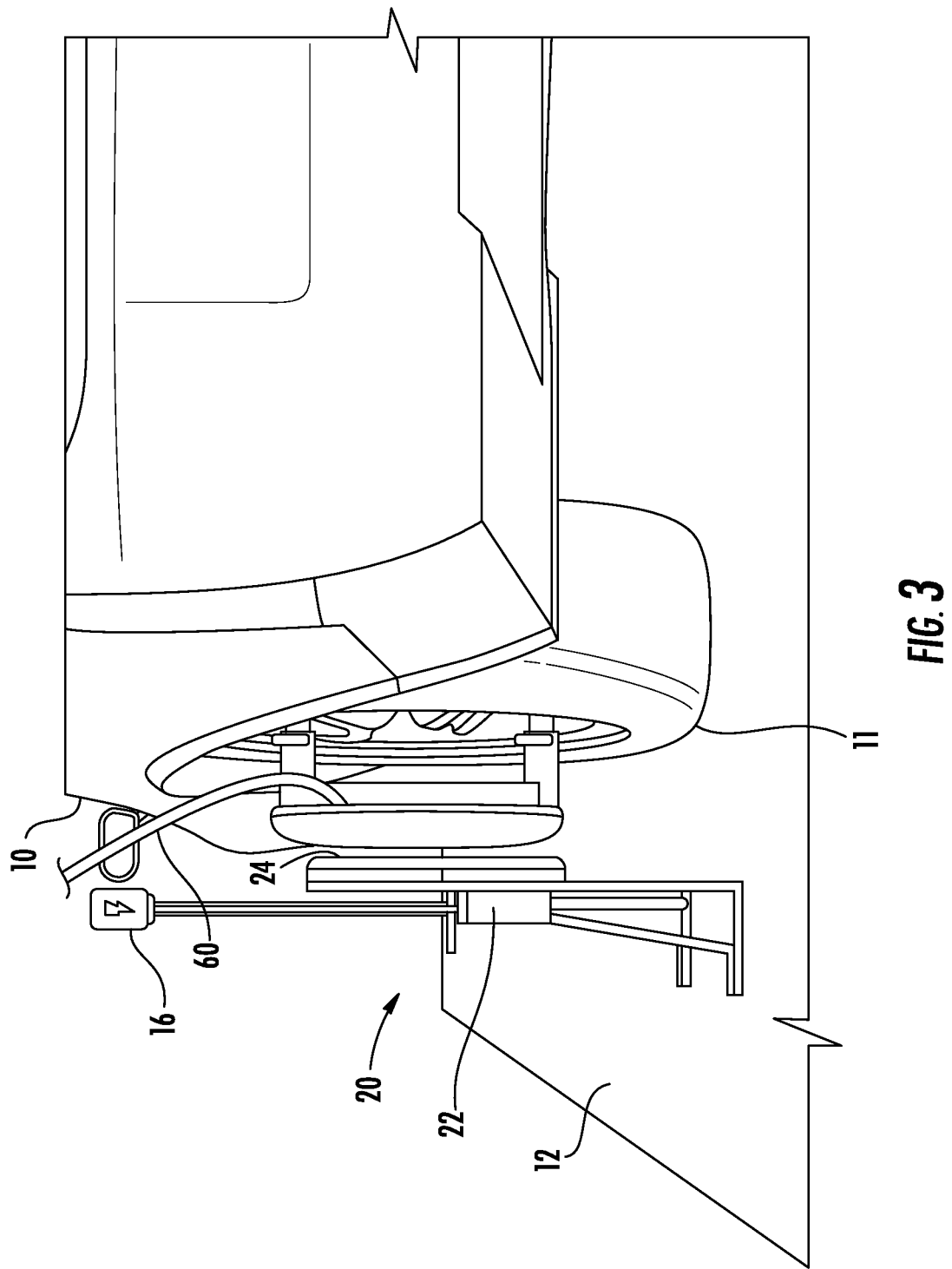
FIG. 3 is an enlarged rear perspective view showing the charging apparatus mounted to a wheel of the vehicle.
Figure 4:
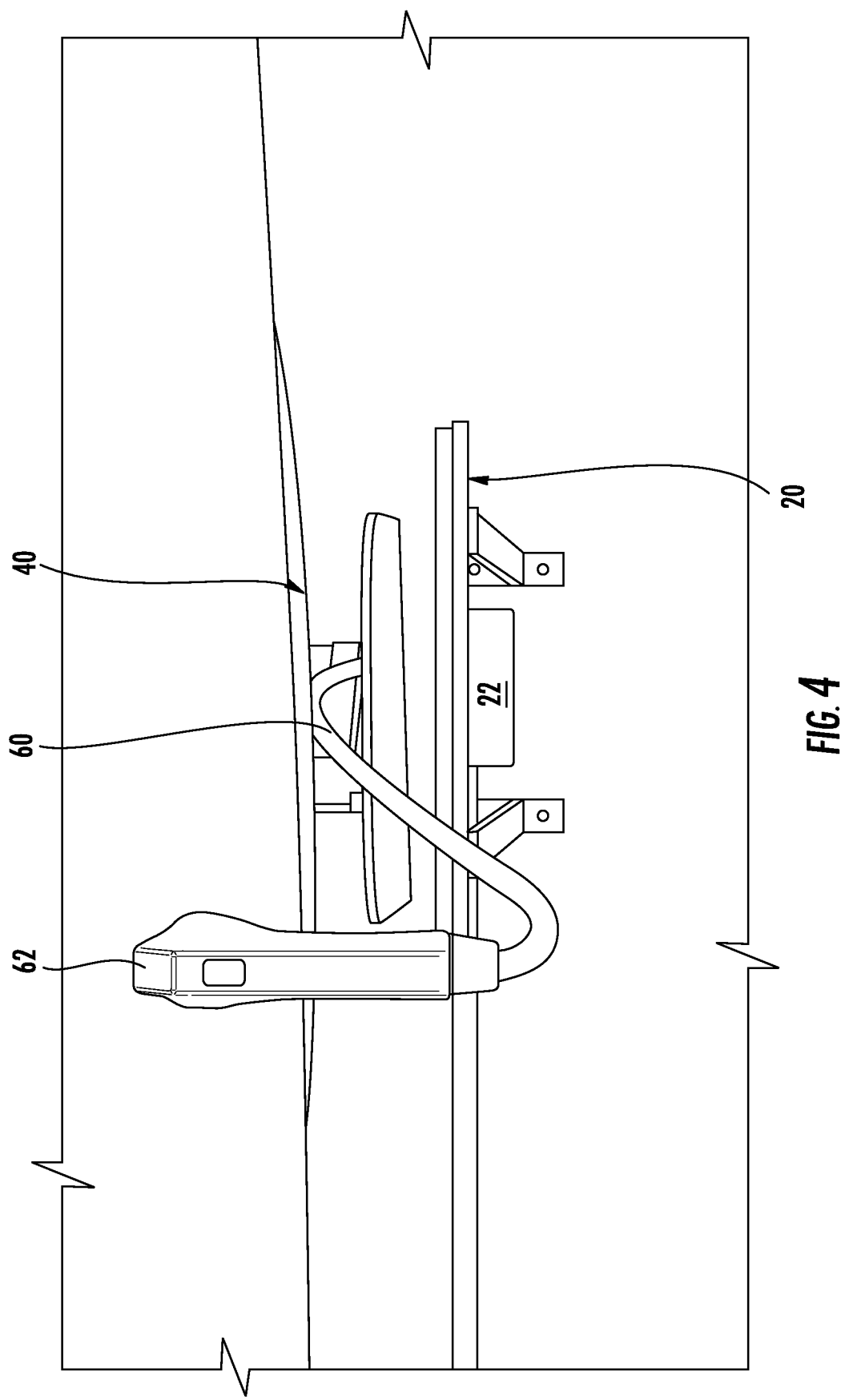
FIG. 4 is a top plan view showing the charging apparatus mounted to the vehicle.
Figure 5:
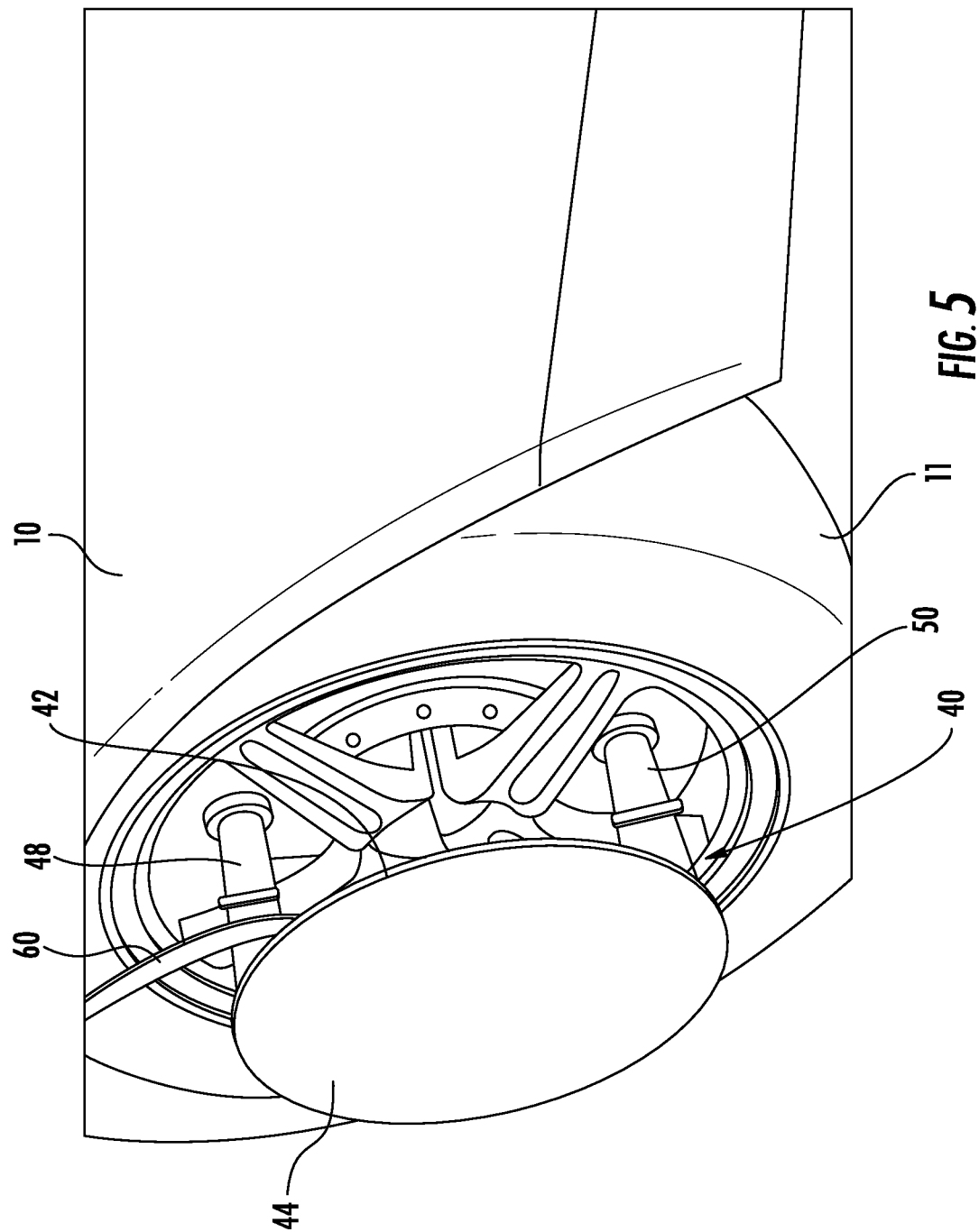
FIG. 5 is a perspective view showing the movable inductive coil mounted to the wheel of the vehicle.

The charging apparatus 14 can be employed by using an automated guided vehicle (AGV—not shown) for delivering the vehicle 10 to the parking spot 12 in the automated parking facility. The AGV will deposit the vehicle 10 so that one of the wheels 11 closely aligns with the stationary inductive coil 20. An employee then will mount the movable inductive coil 42 on the wheel 11 by first adjusting the magnet assemblies 48 and 50 in directions parallel to the rear surface 46 movable inductive coil 42, and if necessary adjusting the lengths of the magnetic bodies 52 and 54. The magnets 56 and 58 of the movable inductive coil assembly 40 then are magnetically mounted to ferromagnetic components of the wheel 11, such as the brake housing for the wheel 11. In this mounted condition, the charging surface 44 of the movable inductive coil 42 will be aligned vertically, as shown in FIGS. 3 and 4 and will be at a position directly opposed to the charging surface 24 of the stationary inductive coil 20 with a specified distance between the charging surfaces 24 and 44. The employee then will connect the plug 62 of the charging cable 60 to the charging outlet of the vehicle 10. The employee than will operate the control unit 16 of the charging apparatus 14 to align with a front wheel to initiate a charging operation, such as a trickle charging operation. The charging apparatus can be disconnected from the vehicle after a specified time, at a designated time when a vehicle owner is returning to retrieve the vehicle or when it is necessary to move or sell a vehicle in an automobile dealership.

The invention has been described with respect to one specific embodiment. However, it is apparent that various changes can be made without departing from the scope of the invention. For example, the stationary and movable inductive coils 20 and 42 are illustrated as being positioned in proximity to a rear wheel of a vehicle. However, the stationary inductive coil 20 can be disposed at the parking spot 12 to align with the front wheel 11 of the vehicle 10, and the movable inductive coil 42 can be mounted to the front wheel 11. These and other changes will be apparent to a person skilled in this art after having read the subject disclosure.

What is claimed is:

1. A charging apparatus for electric or plug-in hybrid vehicles, the charging apparatus comprising:
 a stationary inductive coil mounted in proximity to a parking spot for the vehicle and having a charging surface aligned substantially vertically; and
 a movable inductive coil assembly having a movable inductive coil with a charging surface and a rear surface opposite the charging surface, magnet assemblies being adjustably mounted on the rear surface of the movable inductive coil for mounting the movable inductive coil to a ferromagnetic component of the vehicle, the magnet assemblies are movable toward and away from one another, the movable inductive coil assembly further having a charging cable connected to the movable inductive coil and a charging plug on an end of the charging cable remote from the movable inductive coil and configured for electrical connection to an outlet on the vehicle, wherein the magnet assemblies have magnets mounted to ends of bodies extending substantially parallel to one another and substantially perpendicular to the rear surface of the movable inductive coil, the bodies being adjustable for moving the magnets toward and away from the rear surface of the movable inductive coil.

2. An automated parking facility for parking and charging electric or plug-in hybrid vehicles, comprising:
 a plurality of parking spots;
 stationary inductive coils mounted at specified positions with respect to the parking spots, each of the stationary inductive coils having a charging surface aligned substantially vertically;
 at least one automated guided vehicle configured for moving a passenger vehicle to the parking spot and depositing the passenger vehicle at the parking spot so that a wheel of the passenger vehicle is opposed to and aligned with the charging surface of the stationary inductive coil at the parking spot; and
 a movable inductive coil assembly having a movable inductive coil with a front charging surface and a rear surface opposite the charging surface, magnets adjustably mounted to the rear surface of the movable inductive coil for selectively mounting the movable inductive coil to the wheel of the passenger vehicle and in a position opposed to the charging surface of the stationary inductive coil, the movable inductive coil assembly further having a charging cable extending from the movable inductive coil, the charging cable having a plug at an end remote from the movable inductive coil and configured for electrical connection to a charging outlet of the passenger vehicle.

* * * * *